US008296573B2

(12) United States Patent
Bolle et al.

(10) Patent No.: US 8,296,573 B2
(45) Date of Patent: Oct. 23, 2012

(54) SYSTEM AND METHOD FOR REMOTE SELF-ENROLLMENT IN BIOMETRIC DATABASES

(75) Inventors: Rudolf M. Bolle, Bedford Hills, NY (US); Sharathchandra U. Pankanti, Mount Kisco, NY (US); Nalini K. Ratha, Yorktown Heights, NY (US); Andrew W. Senior, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 1178 days.

(21) Appl. No.: 10/818,317

(22) Filed: Apr. 6, 2004

(65) Prior Publication Data
US 2005/0229007 A1 Oct. 13, 2005

(51) Int. Cl.
*H04L 29/06* (2006.01)
(52) U.S. Cl. ........................................ 713/186
(58) Field of Classification Search .................. 713/186
See application file for complete search history.

(56) References Cited

U.S. PATENT DOCUMENTS

| | | | | |
|---|---|---|---|---|
| 4,752,966 A * | 6/1988 | Schiller | ............... | 382/125 |
| 5,153,918 A * | 10/1992 | Tuai | ............... | 713/182 |
| 5,818,955 A * | 10/1998 | Smithies et al. | ............... | 382/115 |
| 5,930,804 A * | 7/1999 | Yu et al. | ............... | 1/1 |
| 5,933,515 A * | 8/1999 | Pu et al. | ............... | 382/124 |
| 6,229,906 B1 * | 5/2001 | Pu et al. | ............... | 382/116 |
| 6,256,737 B1 * | 7/2001 | Bianco et al. | ............... | 713/186 |
| 6,317,834 B1 * | 11/2001 | Gennaro et al. | ............... | 713/186 |
| 6,373,967 B2 * | 4/2002 | Pu et al. | ............... | 382/115 |
| 6,711,263 B1 * | 3/2004 | Nordenstam et al. | ............... | 380/282 |
| 6,959,874 B2 * | 11/2005 | Bardwell | ............... | 235/493 |
| 6,970,582 B2 * | 11/2005 | Langley | ............... | 382/124 |
| 7,356,705 B2 * | 4/2008 | Ting | ............... | 713/186 |
| 2001/0051924 A1 * | 12/2001 | Uberti | ............... | 705/44 |
| 2002/0010857 A1 * | 1/2002 | Karthik | ............... | 713/168 |
| 2002/0104027 A1 * | 8/2002 | Skerpac | ............... | 713/202 |
| 2002/0112177 A1 * | 8/2002 | Voltmer et al. | ............... | 713/200 |
| 2002/0126881 A1 * | 9/2002 | Langley | ............... | 382/124 |
| 2002/0148892 A1 * | 10/2002 | Bardwell | ............... | 235/380 |
| 2002/0174348 A1 * | 11/2002 | Ting | ............... | 713/186 |
| 2003/0041240 A1 * | 2/2003 | Roskind et al. | ............... | 713/168 |
| 2003/0046237 A1 * | 3/2003 | Uberti | ............... | 705/44 |
| 2003/0120934 A1 * | 6/2003 | Ortiz | ............... | 713/186 |

(Continued)

*Primary Examiner* — Oscar Louie
(74) *Attorney, Agent, or Firm* — Anne Dougherty; Roberts Mlotkowski Safran & Cole, P.C.

(57) ABSTRACT

A method and system is provided to provide enrollment of biometric data from individuals without the need for the enrollees to travel to a central location. The system and method provides for optionally detecting multiple types of biometric data, for example, fingerprints, facial scan, visual scan, iris scan, voice scan, or the like, to be captured at the point of enrollee use. During the biometric capture process, the biometric enrollment device monitors and establishes the identity of the enrollee and measures the quality of the biometric input as it occurs. If unacceptable quality is detected, then repeated biometric scans may be necessary, but is done at time of enrollment avoiding any need to send inaccurate information back to a service institution. When the enrollment process completes, the biometric data is encrypted, time stamped and either mailed back to the service institution or is transmitted back. The biometric device may remain with the user for subsequent use as an identification sensor which may authenticate a user with stored biometric information to authenticate a user's identity for a transaction or a request to access a service or equipment. The biometric enrollment device may also be embodied with another piece of equipment to authenticate use of that equipment.

25 Claims, 6 Drawing Sheets

U.S. PATENT DOCUMENTS

| | | |
|---|---|---|
| 2003/0149880 A1* | 8/2003 | Shamsaasef et al. ......... 713/182 |
| 2003/0163700 A1* | 8/2003 | Paatero ........................ 713/175 |
| 2003/0197593 A1* | 10/2003 | Siegel et al. ................. 340/5.52 |
| 2004/0059924 A1* | 3/2004 | Soto et al. ..................... 713/186 |
| 2004/0123115 A1* | 6/2004 | Schuba et al. ................ 713/186 |
| 2004/0129787 A1* | 7/2004 | Saito et al. ................... 235/492 |

* cited by examiner

SYSTEM AND METHOD FOR REMOTE SELF-ENROLLMENT IN BIOMETRIC DATABASES

BACKGROUND OF THE INVENTION

1. Field of the Invention

The invention generally relates to the field of computer sensors and, more specifically, to a system and method of biometric enrollment devices and remote enrollment using the enrollment devices.

2. Background Description

Security concerns and verification of an individual's identity has become a significant issue for many institutions, employers, and the like. For example, a bank may wish to verify the identity of an individual accessing an account or service. Often access to accounts, services, or facilities relies extensively on passwords or personal identification numbers (PIN). However, biometric information has become more prevalent in replacing or supplementing identification verification.

As a consequence of a more widespread use of biometrics, and as biometric databases become accordingly larger, enrollment into the databases becomes an increasingly difficult problem. Enrollment typically has been a labor intensive and somewhat skilled operation often limited by the availability of staff, time, and relatively complicated hardware.

Currently, institutions wishing to enroll large numbers of people generally require them to travel to a designated location (e.g., Department of Motor Vehicles or bank branch) for enrollment using approved hardware and skilled operators. This is often inconvenient for the enrollee and expensive in terms of time and costs. Some aspects of using these existing enrollment methods include, for example:

(i) Use of bulky hardware;
(ii) Requirement of skilled operators for performing the enrollment; and
(iii) Necessity of the enrollee traveling to an enrollment site.

Some institutions such as banks have experimented with an "inkless paper" enrollment mechanism, for example, a method of making permanent images (e.g., fingerprints) on a recording surface having a thermo sensitive color-developing layer or methods using multi-chemical recording surfaces. The special chemical paper (i.e., "ink-less paper") is mailed to the customers/enrollees who mail back the fingerprints for subsequent scanning. Similarly, some authorities (e.g., Immigration and Naturalization Service or UK Passport Agency) remotely enroll users in a facial image biometric database, requiring the users to send a photograph. The photography, however, must match strict institutional guidelines on size, head pose, illumination, paper type etc. which may require the user/enrollee to travel to a designated place to have the image taken.

Remote enrollment may also be carried out by telephone using speaker identification systems (i.e., voice printing), though this necessarily implies that the speech may be corrupted by channel characteristics and noise.

The invention provides an electronic device and method for remote enrollment that has significant advantages over existing methods of enrollment into biometric databases.

SUMMARY OF THE INVENTION

After considerable review of known art systems, the invention has been developed to solve many problems which has been found with such systems. In particular, for example, the invention provides solutions to the following problems:

(i) Fingerprint/face photograph data being captured in paper form and then requiring scanning to be captured in digital format;
(ii) The quality of the biometric (e.g., illumination/pose of face or pressure of fingerprint) cannot be assessed at the time of capture which then requires multiple operations to correct the problem; and
(iii) Lack of security and trustworthiness in the channel may cause low confidence or trust in the results.

In an aspect of the invention, a method of providing a service for capturing biometric data is provided. The method comprises the steps of acquiring biometric data from one or more biometric sensors, authenticating the enrollee associated with the biometric data and enrolling the authenticated enrollee associated with the biometric data.

In another aspect of the invention, a method includes the steps of acquiring biometric data from one or more biometric sensors, enrolling an enrollee associated with the biometric data, wherein the biometric data is verified for quality at the time of enrollment based on a pre-determined threshold, and delivering the biometric data associated with the enrollee to a service provider.

In another aspect of the invention, a computer program product is provided comprising a computer usable medium having readable program code embodied in the medium. The computer program code includes at least one component to acquire biometric data from one or more biometric sensors, enroll an enrollee associated with the biometric data, wherein the biometric data is verified for quality at the time of enrollment based on a pre-determined threshold, and to deliver the biometric data associated with the enrollee to a service provider.

DETAILED DESCRIPTION OF EMBODIMENTS OF THE INVENTION

Figure 1:
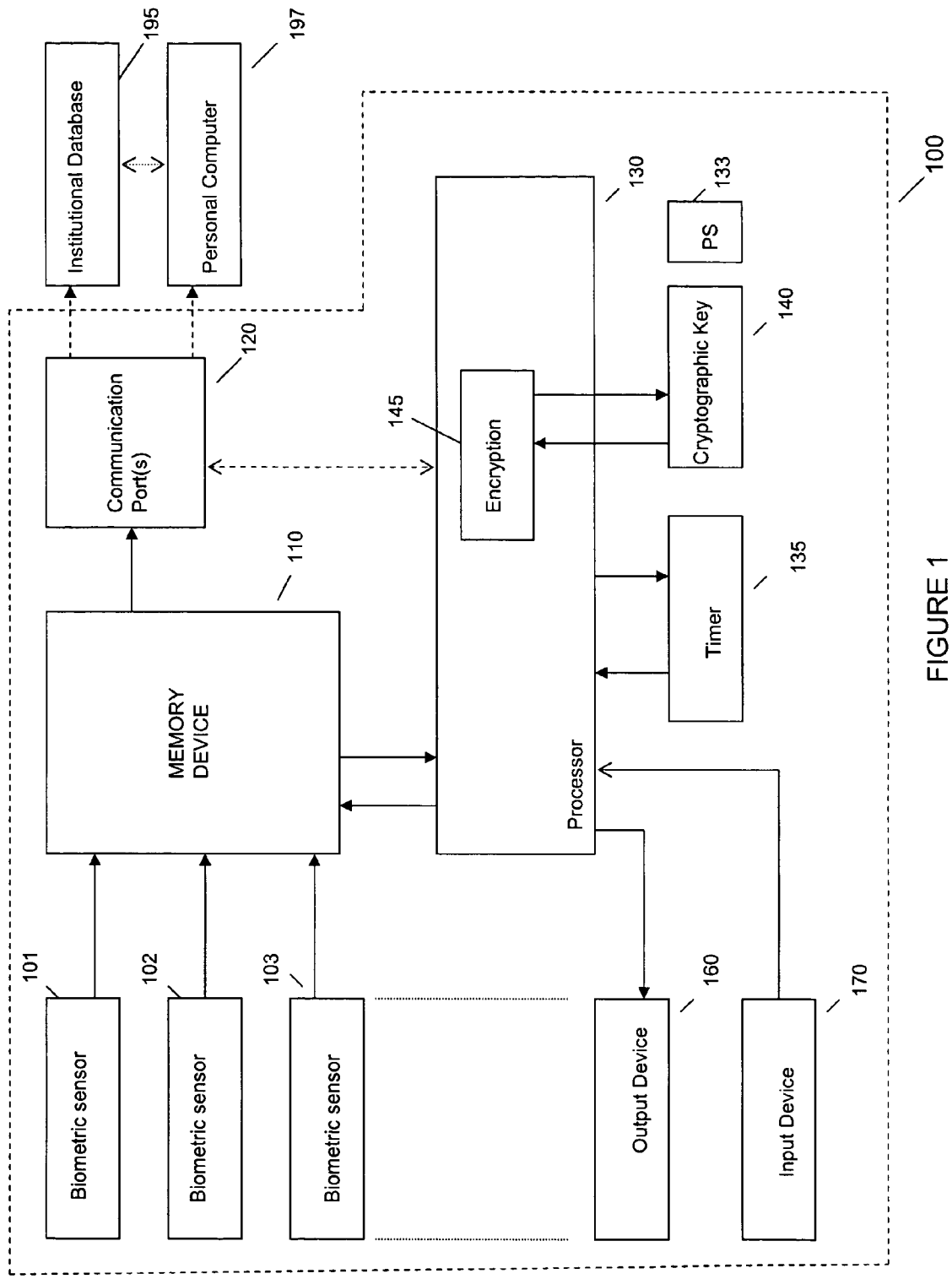
FIG. 1 is a block diagram of an embodiment of the invention.

The invention is directed, for example, to a system and method of remotely enrolling enrollees into biometric databases. The system and method may provide a secure enrollment process without requiring an enrollee to travel to a designated location for enrollment. The biometric enrollment device may also be used to implement a biometric enrollment service that may, for example, obtain, validate and store biometric information on behalf of clients or customers. In addition, the system and method of the invention may be used for secure transactions to validate transactions and user accessibility and ability to transact, and the like FIG. 1 is a block diagram of an embodiment of the invention, generally denoted by reference numeral 100, and referred to as a biometric enrollment device. The biometric enrollment device 100, in embodiments, comprises one or more biometric sensors, 101, 102, and 103, such as, for example, fingerprint scans, eye scans, voice printing, etc. The device 100 includes a memory device 110 for recording biometric data sensed by the biometric sensors 101, 102, and 103. The device 100 includes a processor 130 for controlling one or more system components and a communications port 120 under control of the processor 130 and in communication with the memory device 110. The communication ports 120 may be used to communicate with institutional databases 195 and associated computer systems or personal computers 197 for receiving the results of a biometric session and for at least recording biometric information captured by the sensor.

The biometric sensors 101-103 may include appropriate components for acquisition of, for example, biometric data such as face image, fingerprint, signatures, skin reflectance, voice characteristics (e.g., by using a microphone and support circuitry), iris characteristics (e.g., using an eye scanner), or the like. It should be understood that these examples are not limiting and it should be apparent that other types of sensors are possible. The one or more biometric sensors 101-103 may include any combination of types of sensors. The memory device 110 may be any suitable storage medium (e.g., protected RAM, FLASH memory, disk, DVD, CD-ROMs, or the like) for portable and protected storage of the biometric data.

The invention may also include a timer 135 for time-stamping biometric data operations, a cryptographic key 140, and a encryption component 145 associated with the processor (either internal or external) for encrypting and signing biometric data. An output device 160 (e.g., display) for user feedback, an input device 170 (or input interface) for receiving input from a user may also be provided. A power supply 133 (e.g., a battery or AC supply) provides necessary power to the biometric enrolling device 100, as necessary.

The processor 130 may be any suitable microcomputer for controlling and coordinating biometric acquisition and communication operations (e.g., the biometric sensors 101-103, output device 160, input device 170, communication ports 120, etc.). The processor may be programmed with a preset sequence of acquisition tasks that controls the sequencing of the biometric acquisition. The various components of the biometric enrollment device 100 typically comprise low-powered circuits that may be powered on/off and powered by batteries for easy transport (e.g., mailing of the biometric enrollment device). Alternatively, other suitable power supplies may be used as appropriate.

Figure 2:
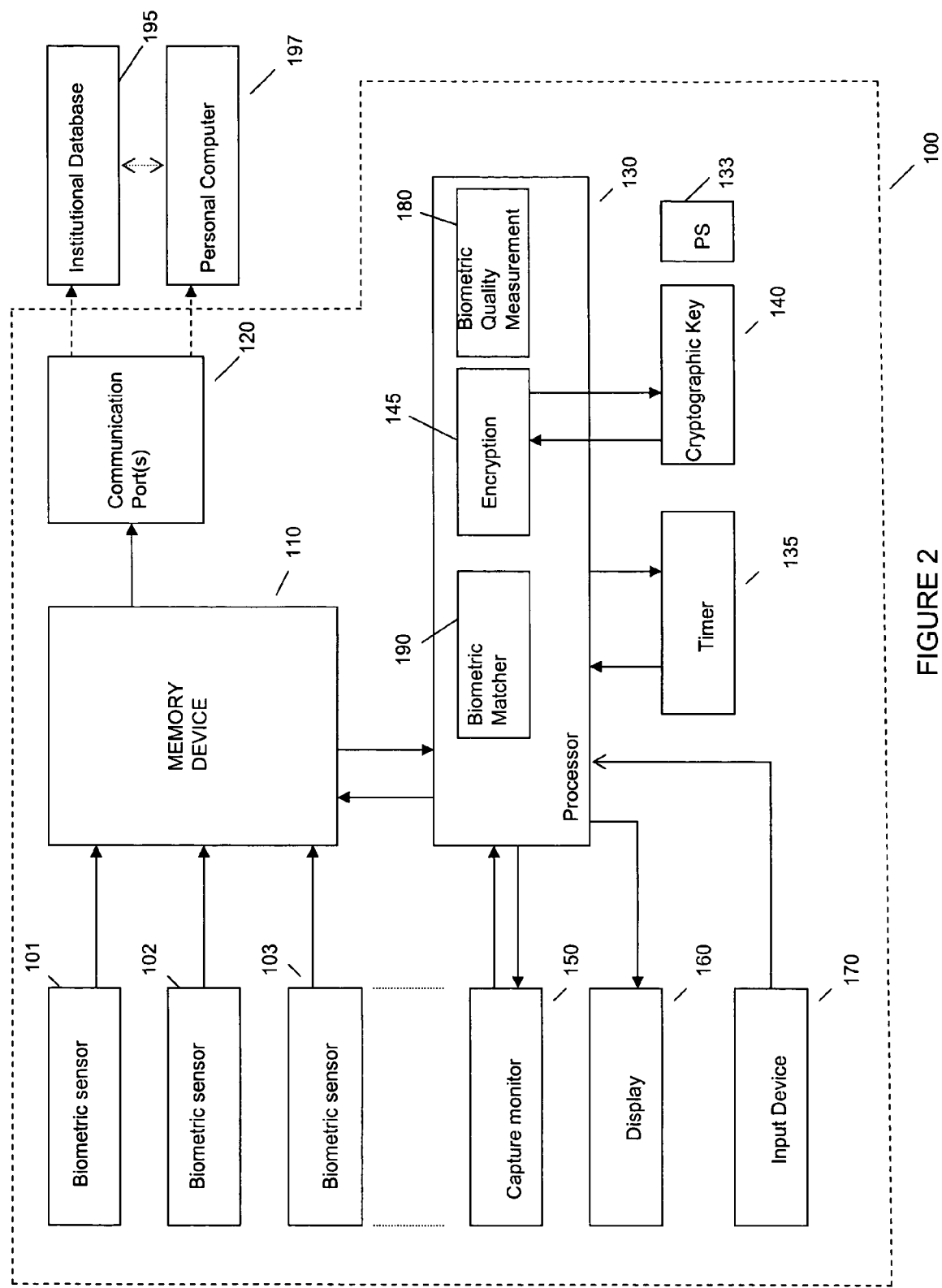
FIG. 2 is a block diagram of an embodiment of the invention.

FIG. 2 is a block diagram of an embodiment of the invention. This embodiment further includes a capture monitor 150, a biometric quality measurement component 180, and a biometric matcher 190. The capture monitor 150 measures and monitors the enrollment process to prevent fraud. For example, the capture monitor 150 may include a pressure sensor to monitor acceptable fingerprint quality, a wide-angle camera to capture a picture that verifies that the face and fingerprint being captured simultaneously are from the same person, a conduction test to verify fingers are from the same hand, or a hand imaging device that verifies that the correct finger is being presented for a scan.

Any logical correlation of input events may be monitored for accurate compliance. The combination may be performed according to predetermined verification standards or plan and typically performed under control of the processor 130. The plan or standards may include, for example, requiring that two fingers be presented simultaneously for fingerprinting, or a fingerprint and an eye scan done sequentially, or a voice scan and face scan performed simultaneously. The plan or standards may stipulate that essentially any combination of biometrics, and in what relationship to one another, is required to capture a biometric or set of biometrics. The plan or standard comprise at least in part an accredited procedure that is expected to occur when used by an enrollee.

The biometric quality measurement component 180, associated with the processor 130, may measure the quality of any biometric input at the point of enrollment using, for example, fingerprint quality analysis, head pose measurement, finger live-ness testing (e.g., not a prosthetic), or similar techniques for assuring that the captured metrics are accurate, valid and of sufficient quality. Further, the standards or plan may stipulate pre-determined thresholds that must be achieved when a biometric is measured. For example, a fingerprint must have a certain number of determinable critical points, or a face scan must include a certain number of discernable characteristics, or a voice print must have a certain minimum duration and include certain recognizable words or phrases, or the voice print background noise must not exceed a certain level, or the like. The biometric quality measurement component 180 is a significant advantage over traditional enrollment methods that require the biometric data to be mailed before quality is assessed. Determining quality of the measured biometrics at the time of enrollment saves time and permits multiple attempts to assure acceptable quality in the biometric scans. Since quality is measurable at the time of a biometric scan, the enrollee may be informed immediately of poor quality or unacceptable presentation of the measured body part. In this manner, time and costs are minimized.

The invention may also present information on the output device 160 (e.g., an LCD or a loudspeaker) of the quality measurement relative to a required threshold (e.g., a pre-determined threshold). In the case of some measures, the output device 160 may provide specific instructions to the user (e.g., "press harder," "turn to your left," "speak louder," "use your left hand index finger", etc.). The invention may automatically acquire the biometric when the quality is improved and becomes sufficient as determined in conjunction with one or both of the capture monitor 150 and quality measurement component 180. Likewise, continued acquisition may be predicated on suitable ongoing quality parameters.

The biometric matcher 190, also associated with the processor 130, compares the biometric data from a biometric scan with a stored record. The biometric matcher 190 may match data based on which type of metric is being processed. For example, a fingerprint scan is compared with previously stored fingerprint record, etc. The biometric matcher 190 may adjust for variations in the data within prescribed tolerances so that acceptable (typically minor) differences between two different scan episodes may be appropriately processed correctly. For example, a fingerprint previously stored may be compared with data from a current finger scan and a comparison may discover that an acceptable subset of critical points in both scans match. That is, a minimum predetermined number of critical points were matched from the two scans. Similarly, for other types of scans, a minimum pre-determined threshold of acceptable data must match between a previously recorded record and a current scan, as appropriate for the type of biometric(s). These predetermined threshold levels may be scaled in accordance with the importance and significance of the security required for the biometric usage as an authentication tool. That is, the more serious the application of the biometrics for controlling authentication events may require higher thresholds to be established.

The biometric enrollment device 100 stores a biometric record of the biometric data in digital format that is not easily viewable and may be encoded. This formatting and encoding requires detailed and extensive knowledge of the internal formatting in order to be successfully attacked. This formatting and encoding may provide a moderate degree of protection in preventing the biometric data to be extracted or tampered with during mailing (e.g., when encryption of the biometric data is not employed).

The biometric data may optionally be encrypted, and when employed, secures the biometric data. The encryption component 145 supplies extensive protection against fraudulent access of the biometric data. Once the biometric data is acquired, the data may be encrypted and a digital signature may also be recorded as supplied with the device by the biometric enrollment device and a cryptographic key. This encryption key that is used for signing may be securely erased (e.g., by writing random bit-patterns throughout the memory) once the keys are no longer needed (e.g., after a successful enrollment). This also aids in preventing the keys from fraudulent discovery. The biometric enrollment device may also detect a tampering operation and also erase its key and any temporary biometric data.

The timer 135 provides a precise time stamp of when the biometric session occurs and is recorded in the memory device 110. The presence of encryption, user feature extraction, time-stamping, and digital signatures in the device provide substantial security protections making post-capture fraud essentially impossible. The encryption component 145 may be carried out by hardware or software and may use one or more cryptographic keys 140.

Figure 3:
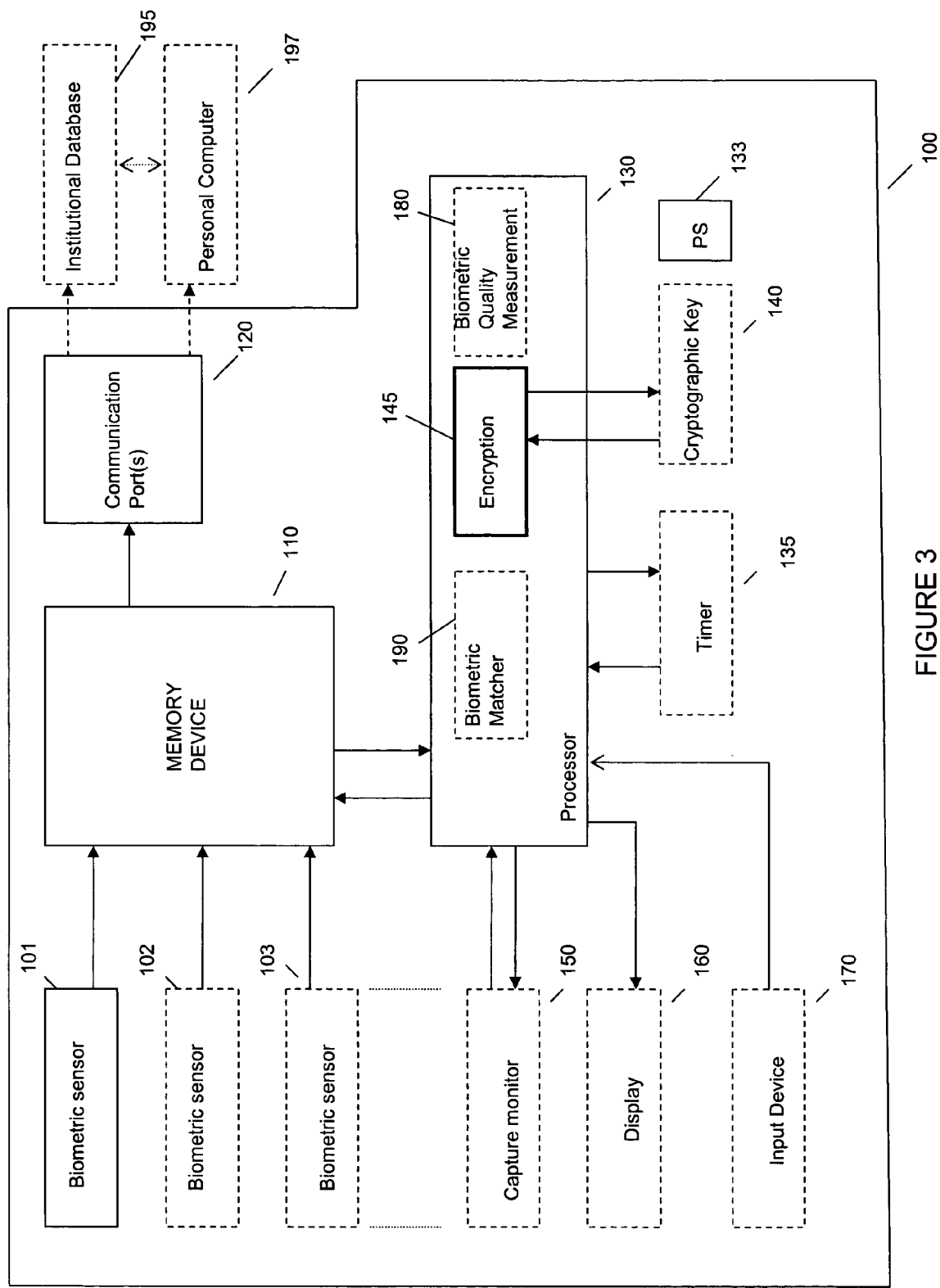
FIG. 3 is a block diagram of showing optional components of the invention.

FIG. 3 is a block diagram showing optional components of the invention. FIG. 3 is similar to FIG. 2, however, embodiments of the invention may include one or more of the optional components (as shown by dotted boxes of the biometric enrollment device 100) in various combinations, depending on circumstances and packaging. FIG. 3 illustrates the optional components which include optional components 102, 103, 135, 140, 145, 150, 160, 170, 180, and 190. Further, the personal computer 197 and institutional database 195 may also be optional aspects of the environment. Accordingly, in all combinations, at least a biometric sensor, a memory, as well as the processor should be provided. The communication port may also be optional though, when institutional database and personal computer are not provided.

To protect the enrollment process further, checks may be established to ensure that the enrolled biometric belongs to the intended enrollee. In previous remote enrollment practices, prior to the invention, a secure mail channel was relied upon to and from the individual enrollee (or enrolling institution). While this is still important, it may be further strengthened with this invention by additional mechanisms, as described below.

In accordance with the invention, a user may use the input device 170 (which may also be incorporated into a biometric sensor itself) to demonstrate to the biometric enrollment device 100 that the enrollee is the intended enrollee. This may be performed by entering confidential or secret information. Such secret information might be the digits of an account code, a PIN or characteristic gesture (previously sent to the enrollee user by a separate mechanism, and unlikely to be simultaneously compromised.)

In situations where the institution has already acquired a biometric record from the enrollee, this may be re-verified before acquiring a new biometric record (or simultaneously captured and verified when the device is returned). This also enables the enrollee to update a biometric record when a biometric changes over time, or if differences do not prohibit recognition of the old biometric. For example, it may be useful to re-enroll face characteristics every 5 years (or other time period), perhaps simultaneous with applying for a new passport. At the time of the incremental update of a biometric, different biometrics may also be acquired, e.g., acquiring an additional fingerprint or acquiring a face image from a customer whose signature is already on record.

The biometric enrollment device 100 may also be reusable, typically by being reset and sent to different customers. Alternatively, the biometric enrollment device 100 might transfer the enrolled biometric data back to the enrolling service institution through another mechanism (e.g., secured communication link or detachable memory component such as an encrypted disc) and remain in the possession of the user or user's employer. The biometric enrollment device may be provided with an interface (e.g., USB, Bluetooth, GSM, wi-fi (wireless fidelity), or 802.11 type wireless) as part of the communications port 120 to communicate directly or indirectly (e.g., through a user's personal computer 197) back to an institution providing enrollment services for long-term storage in an institution database 195. The biometric data may also be sent to and stored by an employer of the enrollee. Alternatively, the biometric enrollment device 100 may not communicate until the device is presented to a predetermined communications device (e.g. bank branch, an ATM or credit card POS machine).

Figure 4:
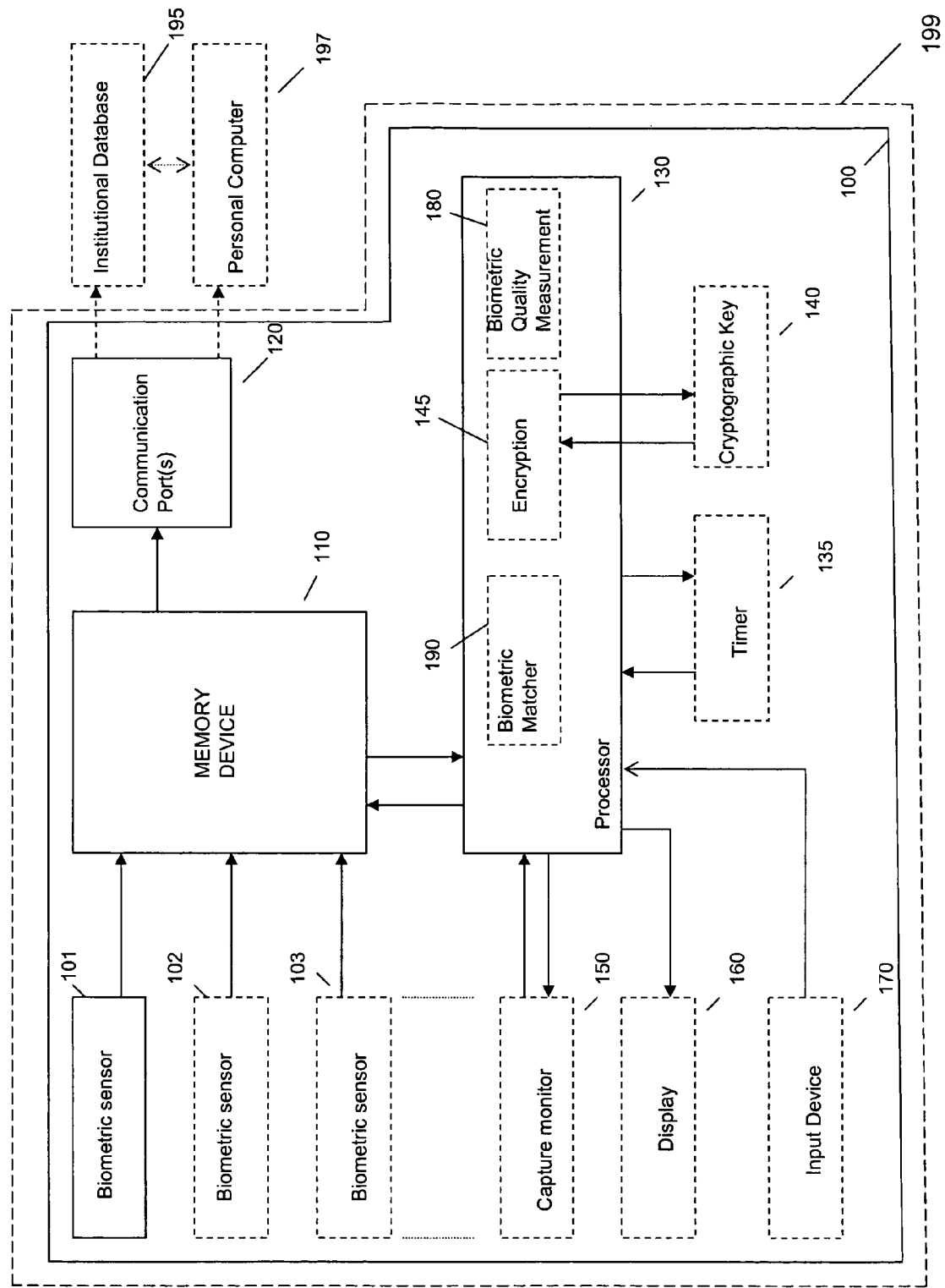
FIG. 4 is a block diagram of an embodiment of the invention included with other operational equipment.

FIG. 4 is a block diagram of an embodiment of the invention included with other operational equipment. The biometric enrollment device 100 may be combined with other operational equipment that has some additional functionality, such as a novelty (calculator), a credit card reader, mail meter, communications equipment, or any other equipment that may require identification generally denoted by reference numeral 199. These examples are exemplary and one should recognize that the biometric device may be used with nearly any type of service, device or equipment. Further, the biometric enrollment device 100 may be external to the device 199 and communicate with the device 199, perhaps remotely over a communications link (e.g., the Internet).

In the embodiment of FIG. 4, the biometric enrollment device 100 may be used as a sensor for verification of one or more biometrics of a potential user of the equipment or device 199, with or without having transferred the data to a central database (e.g., institutional database 195). If a user biometric is not verified, access to the equipment (or service) or device 199 may be denied or an alarm initiated.

Using the Invention

Figure 5A:
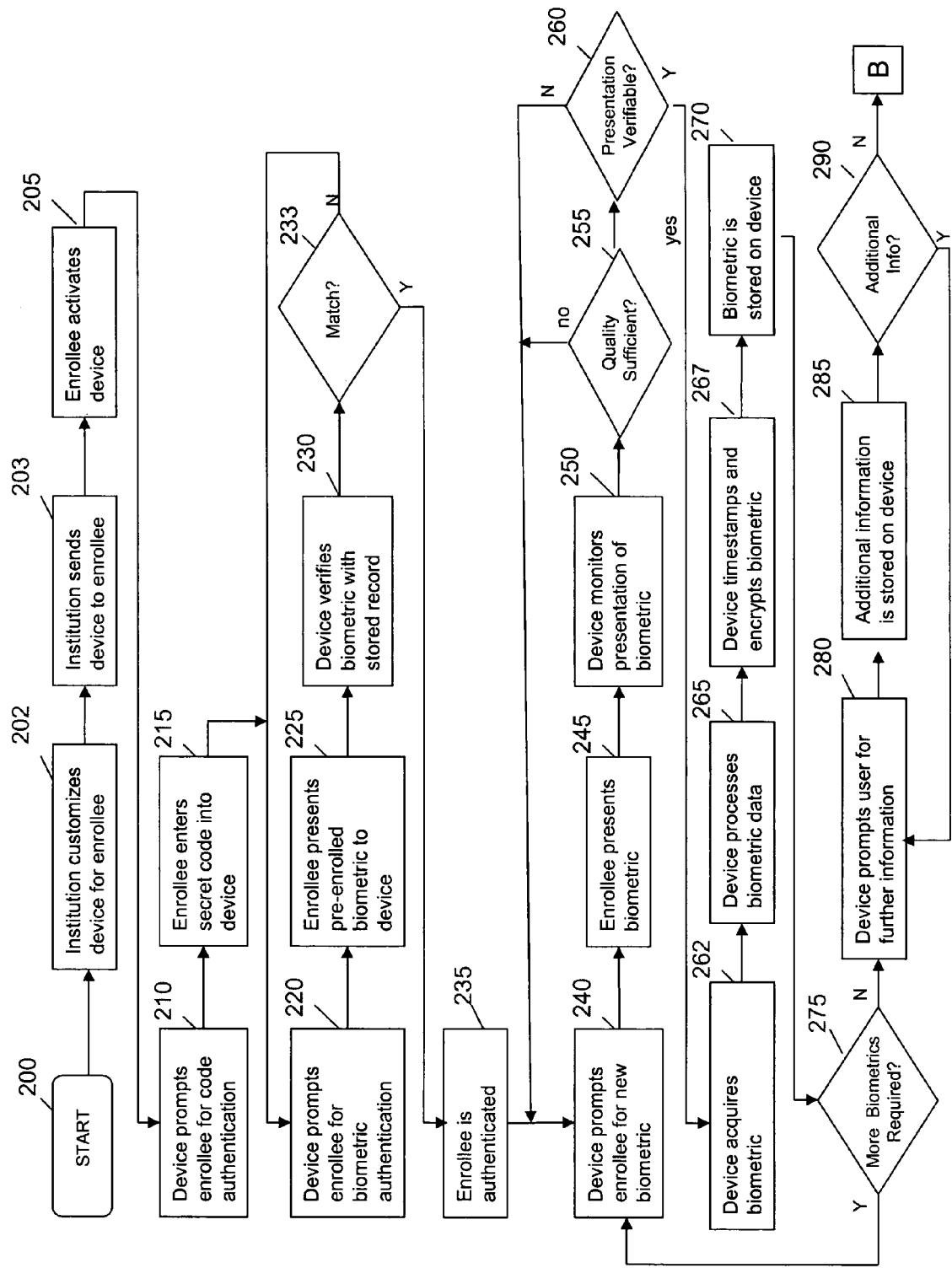
FIGS. 5A and 5B are flow charts showing steps of an embodiment for using the invention.
Figure 5B:
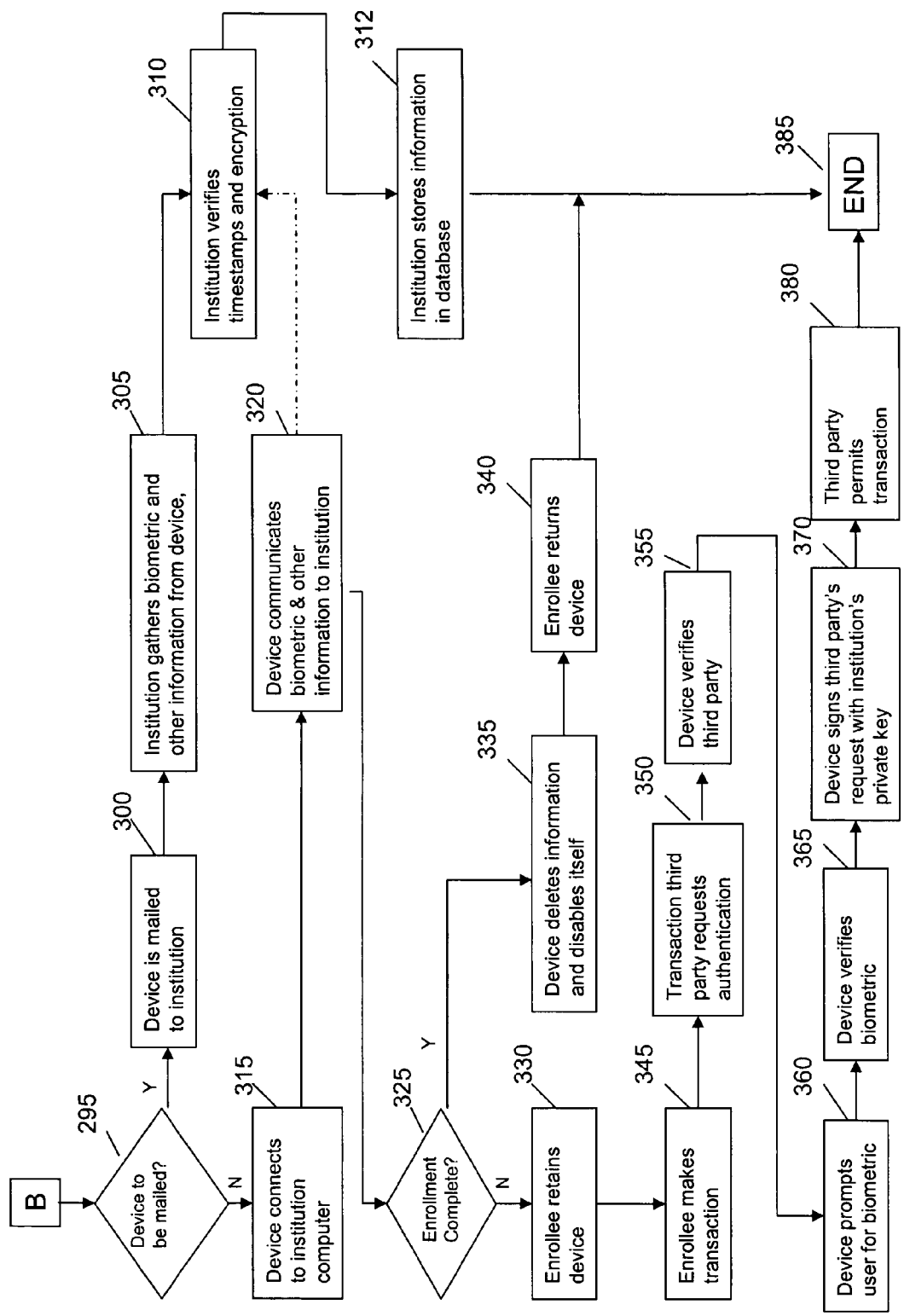

FIGS. 5A and 5B are flow charts showing steps of an embodiment for using the invention, beginning at step 200. FIGS. 5A and 5B are representative of the capture validation and transactional abilities of the invention. For example, portions of FIG. 5A shows the process steps of entering biometric information and portions of FIG. 5B shows process steps for validating the ability to access or participate in certain transactions. FIGS. 5A and 5B may equally represent high-level block diagrams of components of the invention implementing the steps thereof. The steps of FIGS. 5A and 5B may be implemented on computer program code in combination with the appropriate hardware. This computer program code may be stored on storage media such as a diskette, hard disk, CD-ROM, DVD-ROM or tape, as well as a memory storage device or collection of memory storage devices such as read-only memory (ROM) or random access memory (RAM).

Continuing with step 202, the service providing institution customizes the biometric enrolling device for an enrollee. In embodiments, multiple enrollees may be customized on one biometric enrolling device. The customization includes, for example, a user's name, password, public key, PIN, an expected biometric, or one-off key for communication with the service institution from the enrollee or the biometric enrolling device.

At step 203, the service providing institution sends the biometric enrolling device to the enrollee by mail or other secure delivery system. At step 205, the enrollee activates the biometric enrolling device, whereupon, optionally at step 210, the biometric enrolling device prompts the enrollee to authenticate himself. In response to step 210, at step 215 (optional depending on step 210), the enrollee enters a secret code (e.g., secret data previously communicated with the enrollee), if prompted in step 210. At optional step 220, the biometric enrolling device may prompt the enrollee for a biometric, if a biometric is on record from a previous session, for authentication of the enrollee. At optional step 225 (depending on step 220), the enrollee presents the expected biometric to the biometric enrolling device and, in response to step 225, at optional step 230 (depending on step 225), the biometric enrolling device compares the presented biometric with the previously stored biometric template.

In response to optional step 230, at step 233, a check is made whether the presented biometric matches the previously recorded biometric template. If not, the process optionally repeats at step 220. Alternatively, a count is kept for the number of attempts to verify the user and if the count exceeds a predetermined limit, the biometric enrolling device shuts down, optionally erasing all stored data and programs. At step 235, since the password and/or biometric matches the enrollee is considered authenticated.

At step 240, the biometric enrolling device prompts the user for a new biometric to be enrolled. At step 245, the enrollee presents the desired biometric. During steps 240 and 245 (optionally, in other steps as well), an output device may be employed to convey the desired biometric. At optional step 250, the biometric enrolling device may monitor the presentation to check the quality of the biometric. At optional step 255 (depending on optional step 250), a check is made whether the quality level of the biometric is sufficient, and if not, a new prompt may be issued at step 240. Otherwise, at optional step 260 (depending on step 255), a check is made whether the presentation of the biometric is verifiable, i.e., the person presenting the biometric is authenticated to the biometric enrolling device, and if not, the process may repeat (alternatively, it may terminate if a repeat limit is reached, not shown).

If the presentation is verifiable, at step 262, the biometric enrolling device acquires the currently presented biometric by recording the biometric from the appropriate sensor. At optional step 265, the biometric data is processed (e.g., cryptographically signed and/or formatted). At optional step 267, the biometric enrolling device timestamps and encrypts the biometric data. At step 270, the biometric data is stored (for example, in FLASH memory, protected RAM, protected disc, or the like). At optional step 275, a check is made whether more biometrics are required (e.g., more impressions of the same finger, different impressions of multiple fingers, acquiring a face image, voice and finger simultaneously or sequentially, or other combinations, and the like) and if so, the process continues with step 240. Otherwise, at optional step 280, the biometric enrolling device may prompt for new information such as for example, new passwords, account preferences, etc. and at optional step 285 (depending on step 280) the information is stored. At step 290, a check is made whether more information is required and, if so, processing continues at step 280.

Referring now to FIG. 5B, at step 295, a decision is made whether the biometric enrolling device is to be mailed back (or hand delivered) to the enrolling service institution or not. This decision may also be made by the sending institution prior to the biometric device is ever delivered. If so, at step 300, the biometric enrolling device is mailed to the service institution. At step 305, the service institution reads the biometric information from the biometric enrolling device. At step 310, the service institution decrypts, verifies protections, and correlates the biometric data including authenticating the enrollee with the biometric data stored so that all data delivered is verified so that a determination is made that all returned data (including any identification information, such as, for example, passwords or secret data) has been captured or received according to the expected accredited procedure loaded into the biometric enrolling device when the device was initially configured for use. At step 312, if the verification is valid, the institution stores the biometric information in a database for the enrollee(s) and the process completes, at step 385.

If, however, the enrollment is ongoing, or the biometric enrolling device is to be used as an authenticator for service requests or transactions, then at step 330, the enrollee/user retains the biometric enrolling device. At step 345, an enrollee wishes to make a third party transaction and may use the biometric enrolling device to authenticate identity of the third party. At step 350, the transaction third party requests authentication from the biometric enrolling device. At step 340, the biometric enrolling device verifies the third party as a valid third party authorized for the type of transaction being requested. This may be performed by validating a key.

If, however, the enrollment is ongoing, or the biometric enrolling device is to be used as an authenticator for service requests or transactions, then at step 330, the enrollee/user retains the biometric enrolling device. At step 345, an enrollee wishes to make a third party transaction and may use the biometric enrolling device to authenticate identity of the third party. At step 350, the transaction third party requests authentication from the biometric enrolling device. At step 355, the biometric enrolling device verifies the third party as a valid third party authorized for the type of transaction being requested. This may be performed by validating a key.

For an authorized third party, at step 360, the biometric enrolling device prompts the enrollee/user for a stored biometric. At step 365, the biometric enrolling device verifies the stored biometric with the scanned new biometric from the enrollee/user. At step 370, the biometric enrolling device signs the third party's request (e.g., using a key) denoting that the biometric is verified and also informs the enrollee/user of the verification of the third party. A non-verified biometric results in a non-signed request. At step 380, the third party permits the transaction to proceed. The transaction may involve purchases, a use of a service, boarding an aircraft, or any transaction or access where authentication of an individual is desired. At step 385, the process ends.

The invention provides a flexible, secure process, for remotely accepting biometrics for subsequent authentication of the user. This may be done efficiently without the need for the enrollee/users to travel to a central location and also avoids the need for trained specialists to monitor the biometric enrollment process. The biometric enrolling device provides a portable, secure and convenient process for enrolling individuals into a biometric database and subsequent verification of identifications to control access to services, devices, and the like.

While the invention has been described in terms of embodiments, those skilled in the art will recognize that the invention can be practiced with modifications and in the spirit and scope of the appended claims.

What is claimed is:

1. A method of providing a service from a service provider institution for capturing biometric data, comprising the steps of:
    acquiring biometric data from one or more biometric sensors;
    authenticating an enrollee associated with the biometric data;
    enrolling the authenticated enrollee associated with the biometric data, wherein the acquiring occurs externally from equipment that requires an identification;
    verifying individual samplings of the biometric data for quality at the time of enrollment based on a pre-determined threshold;
    verifying whether the enrollee presenting the biometric data is authenticated at the time of enrollment;
    verifying the biometric data according to pre-determined verification standards requiring:
        two fingers presented simultaneously for fingerprinting;
        a fingerprint and an eye scan performed sequentially; and
        a voice scan and face scan performed simultaneously;
    signing a request of a third party with a private key stored on a biometric enrollment device and associated with the third party, the signing denoting that the biometric data is verified for a transaction between the third party and the enrollee; and
    sending the signed third party request to the third party to complete authenticating of the transaction.

2. The method of claim 1, further comprising the steps of:
    delivering the biometric data associated with the enrollee to a service provider; and
    authenticating at the service provider that all delivered data has been captured according to an accredited procedure.

3. The method of claim 1, further comprising the step of communicating the biometric data to an external device using one of a wired or wireless communications port to communicate the biometric data to the external device.

4. The method of claim 1, wherein at least one of the one or more biometric sensors is at least one of a fingerprint sensor, a skin reflectivity sensor, a camera suitable for capture of a facial image, a microphone for acquiring voice data, and an eye scanner, and the one or more biometric sensors acquiring the biometric data sequentially or simultaneously when two or more biometric sensors are present.

5. The method of claim 1, further comprising the step of time stamping the biometric data when the enrolling occurs.

6. The method of claim 1, further comprising at least one of encrypting and certifying the biometric data.

7. The method of claim 1, further comprising the steps of:
    determining a quality measure for the biometric data sensed by the one or more biometric sensors; and
    storing one or more biometric records only when the biometric data is of a quality sufficient to meet a predetermined threshold.

8. The method of claim 1, further including providing feedback to cause a change in the biometric data sensed by the one or more biometric sensors so that an increase in the sensed quality of the biometric data occurs.

9. The method of claim 1, further comprising the step of comparing two biometric records and denying access when the compared two biometrics records are different.

10. The method of claim 1, further comprising the steps of:
    receiving at least one of a password, a secret data, and a user identification before sensing biometric data occurs; and
    verifying one or more previously enrolled biometrics before allowing enrollment of additional biometric data.

11. The method of claim 1, further comprising the steps of:
    creating one or more biometric records;
    encrypting the one or more biometric records; and
    associating the one or more biometric records with the enrollee.

12. The method of claim 1, further comprising the step of connecting to communications equipment to remotely communicate with the service provider.

13. The method of claim 1, further comprising providing immediate feedback to the enrollee based on whether the pre-determined threshold had been met.

14. The method of claim 1, further comprising detecting tampering with a biometric enrollment device and erasing the biometric data from the biometric enrollment device as a result of the tampering.

15. The method of claim 1, further comprising reusing a biometric enrollment device, which includes one or more biometric sensors, by sending the biometric enrollment device to another enrollee.

16. The method of claim 15, wherein the biometric enrollment device remains in the possession of the enrollee.

17. The method of claim 15, further comprising customizing the biometric enrollment device to the enrollee.

18. The method of claim 17, wherein the customizing includes at least one of a user name, password, public key, personal identification number, and an expected biometric.

19. The method of claim 15, further comprising returning the biometric enrollment device to an enrolling service institution after the enrollee has been enrolled.

20. The method of claim 1, wherein:
    the one or more biometric sensors comprise a fingerprint sensor, a skin reflectivity sensor, a camera suitable for capture of a facial image, a microphone for acquiring voice data, and an eye scanner; and
    the method further comprises:
        receiving the third party request from the third party for the authenticating of the transaction between the third party and the enrollee; and
        verifying the third party as a valid third party authorized for a type of the transaction being requested.

21. The method of claim 20, wherein:
    the verifying of the third party comprises validating a key associated with the third party; and
    the method further comprises informing the enrollee of the verification of the third party.

22. A method of providing a service from a service provider institution for capturing biometric data, comprising the steps of:
    acquiring biometric data from one or more biometric sensors;
    enrolling an enrollee associated with the biometric data, wherein individual samplings of the biometric data are verified for quality at the time of enrollment based on a pre-determined threshold;
    delivering the biometric data associated with the enrollee to a service provider;
    receiving a request from a third party for authenticating a transaction between the third party and the enrollee;
    verifying the third party as a valid third party authorized for a type of the transaction being requested;
    authenticating an enrollee using at least one of a password, a user identification and a previously stored biometric prior to the enrolling step and limiting access until the authenticating is successful;

signing a request of a third party with a private key stored on a biometric enrollment device and associated with the third party, the signing denoting that the biometric data is verified for a transaction between the third party and the enrollee;

verifying the acquired biometric data meets pre-determined verification standards requiring:
two fingers presented simultaneously for fingerprinting,
a fingerprint and an eye scan performed sequentially, and
a voice scan and face scan performed simultaneously;

encrypting the biometric data producing encrypted biometric data; and generating a time stamp of when the enrolling occurs.

23. A computer program product comprising a tangible computer usable storage memory device having readable program code embodied in the tangible computer usable storage memory device, wherein the computer readable program, when executed on a computing device, provides a service from a service provider institution and is operable to cause the computing device to acquire biometric data from one or more biometric sensors;

enroll an enrollee associated with the biometric data, wherein individual samplings of the biometric data are verified for quality at the time of enrollment by comparing the biometric data to a pre-determined threshold;

verify whether the enrollee presenting the biometric data is authenticated at the time of enrollment;

verify the biometric data according to pre-determined verification standards requiring:
two fingers presented simultaneously for fingerprinting;
a fingerprint and an eye scan performed sequentially; and
a voice scan and face scan performed simultaneously;

deliver the biometric data associated with the enrollee to a service provider;

sign a request of a third party with a private key stored on a biometric enrollment device and associated with the third party, the signing denoting that the biometric data is verified for a transaction between the third party and the enrollee; and send the signed third party request to the third party to complete authenticating of the transaction.

24. The computer program product of claim 23, wherein:
the one or more biometric sensors comprise a fingerprint sensor, a skin reflectivity sensor, a camera suitable for capture of a facial image, a microphone for acquiring voice data, and an eye scanner; and the computing device at least one component is further operable to:
receive the third party request from the third party for the authenticating of the transaction between the third party and the enrollee; and
verify the third party as a valid third party authorized for a type of the transaction being requested.

25. The computer program product of claim 24, wherein:
the verifying of the third party comprises validating a key associated with the third party; and
the computing device is further operable to inform the enrollee of the verification of the third party.

* * * * *